Jan. 28, 1936.     G. V. SZABO     2,029,139
ASH RECEPTACLE
Filed Jan. 23, 1931     2 Sheets-Sheet 1

Gustave V. Szabo INVENTOR
BY Schechter Lotsch
his ATTORNEYS

Jan. 28, 1936.     G. V. SZABO     2,029,139
ASH RECEPTACLE
Filed Jan. 23, 1931     2 Sheets-Sheet 2
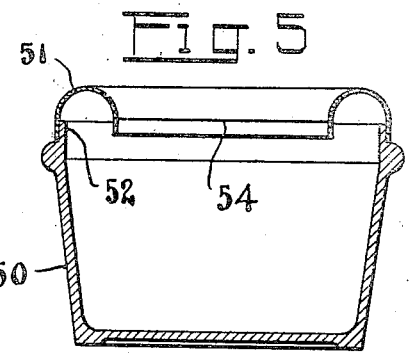
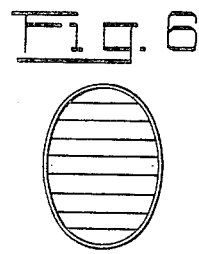
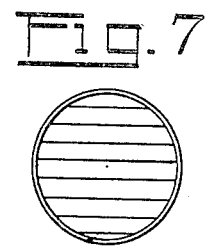
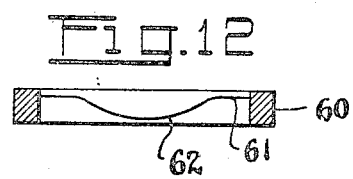
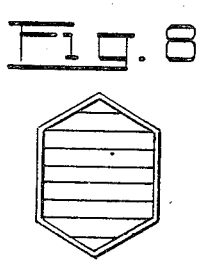
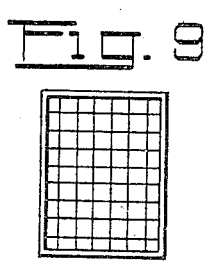
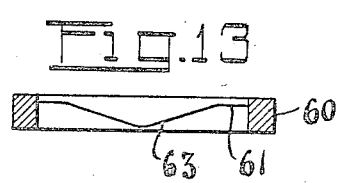
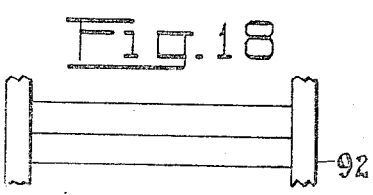
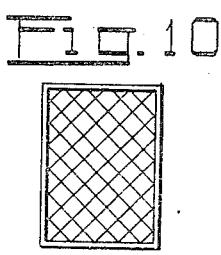
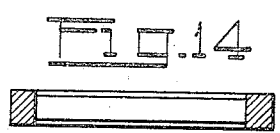
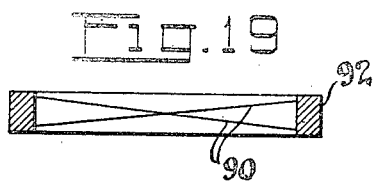
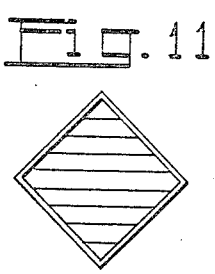
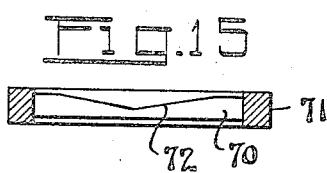
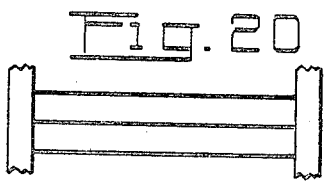
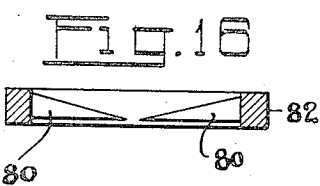
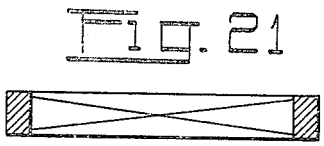
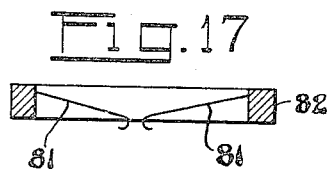
INVENTOR
Gustave V. Szabo
BY Schechter Lotsch
his ATTORNEYS Patented Jan. 28, 1936

2,029,139

UNITED STATES PATENT OFFICE 2,029,139

ASH RECEPTACLE

Gustave V. Szabo, New York, N. Y.

Application January 28, 1931, Serial No. 511,675

4 Claims. (Cl. 131—51)

This invention relates in particular to ash trays and in general to smokers' appliances which embody a cigar or cigarette support or holder, or which provide an ash receptacle.

It is among the prime objects of the invention to provide a support for a cigar or cigarette which will positively prevent contact of the burning portion with a flat surface and which thus eliminates the nauseating smell and the unpleasant taste of sweated cigarettes or cigars, the sweating being a result of the contact of a burning surface with a flat support.

Another object is to provide an ash tray having a cigar or cigarette support which so supports the article that it may freely burn to the end and thus be entirely consumed so as to avoid the customary unsanitary and unsightly stub or butt.

Another object of the invention is to provide a support which will prevent fire hazards and damage of furniture, rugs or the like due to dropping of the article after it has burned from the support, and is absolutely fireproof.

Another object of the invention is to provide a support of the character described, which is sanitary, as it prevents the communication of germs. By utilizing an ash receptacle embodying my invention it eliminates the possibility of the spreading of disease or the possibility of coming in contact with germs from one who has a contagious disease, as for instance,—tuberculosis. When such a person places his cigar or cigarette on the present day type of structure, germs are naturally communicated to such structure, and anyone else, in placing his cigar or cigarette on the device, is liable to become infected with such germs.

From the above it will be seen that the invention provides a novel, simple, effective and efficient ash receptacle which is sanitary and fireproof, and which prevents undesirable odor due to the sweating of cigarettes, prevents the accumulation of stubs or butts within the receptacle, and which in general greatly enhances the pleasure of smoking.

Numerous other objects and advantages of the invention will be apparent from a consideration of the following specification and the accompanying drawings.

While the present invention is suitable to a very wide variety of embodiments as indicated by the drawings, and while the invention is in no way limited to any specific form illustrated, it may be considered as a screen or grating suitably supported, preferably in permanent combination with a unitary receptacle or a grilled frame on legs or on any ash receptacle, into which ashes may drop from a cigar or cigarette supported upon the screen. The screen may be of many different forms and may consist of meshed or crossed wires, parallel wires, vertical bars or strips, or correlated adjacent preformed or bent wires or strips. In any case the arrangement is such that the cigar or cigarette is supported with a minimum contact, and so that it may freely receive air so as to be wholly reduced to ashes and drop through the screen to the receptacle.

The fine wires or strips exposing the minimum surface area are spaced to fully support a cigar or cigarette. Thus it will be apparent that no partially consumed cigar or cigarette can possibly fall through the supporting means unless wholly consumed. It is also apparent that if no partially consumed cigars or cigarettes can fall through the screen, the grille need be used as the only means of removing the ashes of the cigars or cigarettes accumulated therein.

In the drawings—

Fig. 5 is a sectional view illustrating the invention as used with a different type of receptacle;

Fig. 6 is a plan view showing the invention as applied with an oval top opening;

Fig. 7 is a plan view showing the invention as applied with a round top opening;

Fig. 8 is a plan view showing the invention as applied with a hexagonal top opening;

Fig. 9 is a plan view showing the invention as applied with a rectangular top opening, and having crossed wires parallel to the sides and ends;

Fig. 10 is a plan view showing the invention as applied with a rectangular top opening and having crossed wires at an angle to the sides and ends;

Fig. 11 is a plan view showing the invention as applied with a rectangular top opening having a single set of wires arranged at an angle with the sides and ends;

Figs. 12 and 13 illustrate the invention utilizing preformed or bent wires;

Figs. 14 and 15 illustrate the use of a set of blades or strips arranged on the edges to provide a cigar or cigarette support.

Fig. 16 shows the use of cooperating strips or wire which do not extend all the way across the receptacle mouth;

Fig. 17 illustrates a similar inventive concept utilizing wires;

Fig. 18 is a fragmentary top plan view of one form of the invention which utilizes alternate slanted wires;

Fig. 19 is a sectional view of the invention as shown in Fig. 18;

Fig. 20 is a top plan view of the form of the invention which utilizes two wires touching each other at the point of crossing;

Fig. 21 is a sectional view of the invention as shown in Fig. 20.

Figure 1:
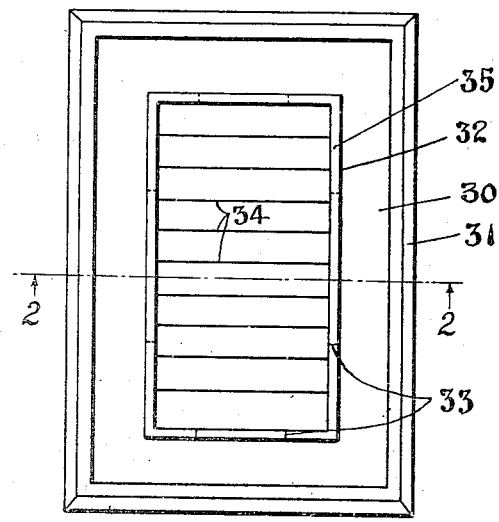
Fig. 1 is a top plan view of one form of the invention.
Figure 2:
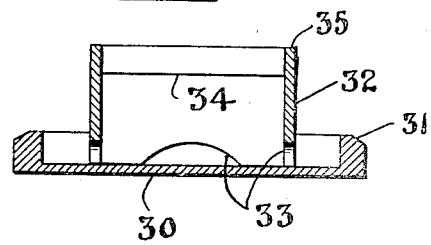
Fig. 2 is a sectional view taken on lines 2—2 of Fig. 1.

In reference to Figs. 1 and 2 of the drawings, a simple, sturdy and efficient receptacle is provided comprising a shallow tray 30 having an edge 31 supported upon the tray and set inwardly therefrom to provide a bordering flange for matches, cigarettes, cigars, or merely for ornamentation. There is a rectangular receptacle forming frame 32, its lower edges being cut away as at 33 to provide for discharge of ashes and to provide a free air passage. Across the frame or mouth of the receptacle are stretched parallel wires 34. The wires 34 are preferably set across the receptacle slightly below the outer edge 35 thereof so as to provide a bordering edge to prevent rolling or accidental movement of a cigar or cigarette from the wire which forms an open screen or grille upon which the article lies while burning and which permits free and unsweating burning until it is wholly consumed.

In connection with Figs. 1 and 2, it will be understood that the invention is in no manner limited to the shape, size or general configuration of either the tray or frame, either or both of which may be round, oval, square, or many sided, nor is the screen restricted to simple parallel wires, but it may be fabricated by crossed wires or formed of bent wires, or be a grille using strips, all of which is hereinafter illustrated but the supporting means must present a minimum supporting surface to the burning cigar or cigarette and be spaced sufficiently close together to prevent any unconsumed portion from falling through.

Figure 3:
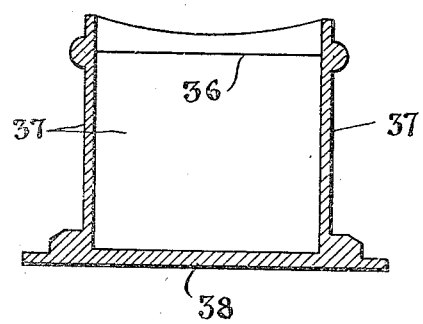
Fig. 3 is a view similar to Fig. 2 of a different form of the invention.

Fig. 3 illustrates a form of the invention in which receptacle and base or tray are of a single material and thus represents a unitary structure which may be more inexpensively formed than that of Figs. 1 and 2. The design and shape of this form may also vary as pointed out above, such variations being within the scope and intention of the invention. The wires are here indicated by numeral 36. The receptacle is illustrated as having side walls 37 and an integral unitary base 38.

Figure 4:
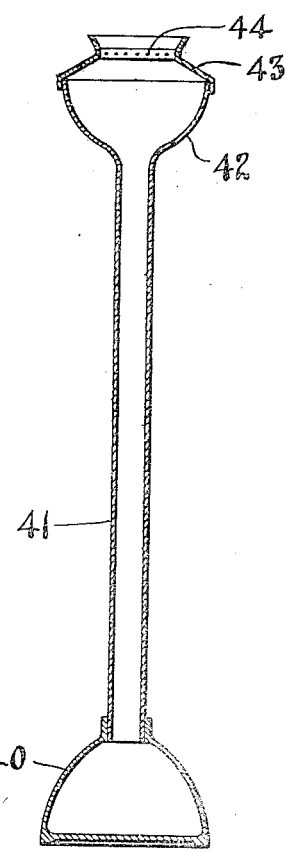
Fig. 4 is a vertical section of a stand type smoker's appliance embodying the invention.

Fig. 4 illustrates the application of the invention to the present popular stand type of smoker's accessory. The stand is illustrated as having a lower removal base compartment 40 which receives ashes and which may as in many cases be weighted to prevent toppling over of the stand. From the base rises a tubular body pipe 41, which terminates in a bowl forming upper flare 42 which is surmounted by an enclosing cover 43, across the mouth of which extends the screen or grille 44 which forms the openwork for supporting the cigar or cigarette. It will of course be understood that this specific structure is merely by way of illustration and shows only in a diagrammatic manner how the invention may be applied to innumerable shapes, types and designs of such stands.

Another form of desk or table type receptacle is shown in Fig. 5, the receptacle body 50 having an inturned and preferably artistically turned annular cover ring 51 which fits over the upper flange 52 of the receptacle so that it may be easily removed for cleaning. The ring 51 supports across the opening of the receptacle the screen or grille wires or strips 54.

This and other forms of the invention may of course be either oval, round or hexagonal as shown in Figs. 6, 7 and 8 respectively. With the use of wires, the parallel wires may be substituted for a wire mesh or net formed by crossed wires parallel with the sides as shown in Fig. 9, or by wires at an angle to the sides and ends as in Fig. 10. Fig. 11 illustrates the fact that the invention contemplates arranging even a single set of wires in parallel formation, but at an angle to the sides or ends.

A further modification of the wire arrangement is shown in Figs. 12 and 13, the top plan view of which will appear as in Fig. 18. This form of the invention contemplates the use of preformed or bent wires 61 which are supported from the receptacle sides 60 and which have a central slope formed by downward curves 62 as in Fig. 12 or by inclined bends 63 as in Fig. 13. In either form this central slope forms a natural resting place for the cigar or cigarette into which it will roll and be prevented from falling from the grille or net.

Fig. 15 shows the use of spaced flat strips, ribs or slot-like members 70 which give the top plan appearance of Fig. 18 and which are supported across the mouth of the receptacle as by the side walls 71. These strips may have a sloping or slanting upper surface as at 72 forming a depression for the article as in Figs. 12 and 13.

Figs. 16 and 17 illustrate the use of strips 80 or wires 81 respectively which do not extend fully across the mouth of the receptacle or frame 82, but which extend inwardly from the walls sufficiently to form a substantially continuous open support. In both instances it will be noted that the depression before referred to may be provided.

In Fig. 19 a way of providing a centrally depressed grille or net of wire is illustrated, each adjacent wire 90 extending from the top edge of the frame or receptacle 92 downwardly to the opposite side, every other wire being parallel with the intermediate ones at an angle.

As has been explained heretofore, the supporting means must present the least possible surface to the burning cigar or cigarette and be spaced sufficiently close together to avoid allowing any unconsumed parts thereof to fall through the supporting means. Thus there is a dual relationship between the size of wires and the space between them. The smaller the supporting article, the smaller the spaces should be between the supporting means and hence the finer the wire. Thus it will be impossible to insert a stub of a cigarette or cigar between the supporting means intentionally or otherwise due to the design. Another feature of the invention relates to the fact that inasmuch as provision is made only for the entrance of ashes to the receptacle through the supporting means, the ashes may be eliminated through the same. Where a unitary structure is not disclosed and the grille may be removed from the receptacle, such removal is only for the purpose of cleaning the receptacle and not for the removal of butts of cigars or cigarettes nor their entrance thereto.

In accordance with the provisions of the patent statute, I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which, objects of my invention are attained and new results accomplished; as it is obvious that the particular embodiments herein shown and described are only some of many that can be employed to attain these objects and accomplish these results.

Having now described my invention, what I claim is new, and desire to secure by Letters Patent is:

1. An ash receiver for cigars and cigarettes comprising a shallow flanged tray, a receptacle of substantially greater height than the tray, mounted in the tray but spaced from the flange thereof, air vents formed in the lower portion of said receptacle and communicating with said tray and a grid spanning the top of said receptacle.

2. An ash receiver for cigars and cigarettes comprising a shallow flanged tray, a receptacle of substantially greater height than the tray, mounted in the tray but spaced from the flange thereof, a plurality of air vents, arranged in opposite pairs, formed in the lower portion of said receptacle, and a grid spanning the top of said receptacle.

3. An ash receiver for cigarettes, adapted to entertain slow combustion of cigarettes deposited thereon, comprising a rectangular tray, surrounded by a narrow flange, a rectangular open receptacle of less width and breadth but greater height than the tray, positioned therewithin, with its side walls spaced from, but parallel with, said flange and forming a chimney, draft holes formed in the lower portions of said receptacle walls communicating with the interior of the tray, and a screening suspended within the mouth of said receptacle for the deposition of burning cigarettes.

4. A tray for the reception only of a smoking article such as a cigar or cigarette, consisting of a receptacle structure, containing an opening for the reception of the ashes of said smoking article, said opening containing a plurality of fine supporting wires so spaced that a cigarette or cigar will not pass through unless entirely consumed into ashes, said wires being sufficiently thin to cause the paper of a cigarette supported thereon to be entirely consumed into ashes.

GUSTAVE V. SZABO.